United States Patent
Montacie et al.

(10) Patent No.: US 6,349,279 B1
(45) Date of Patent: Feb. 19, 2002

(54) METHOD FOR THE VOICE RECOGNITION OF A SPEAKER USING A PREDICTIVE MODEL, PARTICULARLY FOR ACCESS CONTROL APPLICATIONS

(75) Inventors: Claude Montacie, Paris; Marie-José Caraty, Alforville; Jean-Luc Le Floch, Taverny, all of (FR)

(73) Assignee: Universite Pierre et Marie Curie, Paris (FR)

( * ) Notice: Subject to any disclaimer, the term of this patent is extended or adjusted under 35 U.S.C. 154(b) by 0 days.

(21) Appl. No.: 09/171,958
(22) PCT Filed: Apr. 25, 1997
(86) PCT No.: PCT/FR97/00753
§ 371 Date: Apr. 5, 1999
§ 102(e) Date: Apr. 5, 1999
(87) PCT Pub. No.: WO97/42625
PCT Pub. Date: Nov. 13, 1997

(30) Foreign Application Priority Data

May 3, 1996 (FR) .......................................... 96 05566

(51) Int. Cl.[7] ............................................. G10L 15/00
(52) U.S. Cl. ....................................... 704/246; 704/231
(58) Field of Search ................................ 704/231, 246, 704/250

(56) References Cited

U.S. PATENT DOCUMENTS

| | | | |
|---|---|---|---|
| 4,885,790 A | * 12/1989 | McAulay et al. | .............. 381/36 |
| 4,956,865 A | 9/1990 | Lenning et al. | |
| 5,054,072 A | * 10/1991 | McAulay et al. | .............. 381/31 |
| 5,054,084 A | 10/1991 | Tanaka et al. | |
| 5,097,509 A | 3/1992 | Lennig | |
| 5,469,529 A | * 11/1995 | Bimbot et al. | .............. 704/246 |
| 5,522,012 A | * 5/1996 | Mammone et al. | ......... 704/250 |
| 5,794,194 A | * 8/1998 | Takebayashi et al. | ....... 704/251 |
| 6,081,782 A | * 6/2000 | Rabin | ......................... 704/275 |

OTHER PUBLICATIONS

Montacie et al., "Discriminant ar–vector models for free–t-ext speaker verification," *European Conference on Speech Communication and Technology (Eurospeech)*, vol. 1, Sep. 21, 1993, pp. 161–164.

* cited by examiner

*Primary Examiner*—Fan Tsang
*Assistant Examiner*—Michael N. Opsasnick
(74) *Attorney, Agent, or Firm*—Banner & Witcoff, Ltd.

(57) ABSTRACT

The invention discloses a method for the voice recognition of a speaker using a q-order predictive model, comprising a step for extracting the statistical characteristics including a step of digital acquisition of the speaker's voice sample, corresponding to one or several utterances, a step of converting this voice sample into a sequence of vectors of size p, obtained from a series of analysis windows of average size T and an average spacing I, and a step of determining q+1 matrices from this vector sequence. The average size T is of duration of less than 10 ms and the average spacing I of a duration of less than 4.5 ms. The invention is useful in a sound lock including an electroacoustical conversion system (HP,6) and a recorded program implementation system (5) for the method.

20 Claims, 2 Drawing Sheets

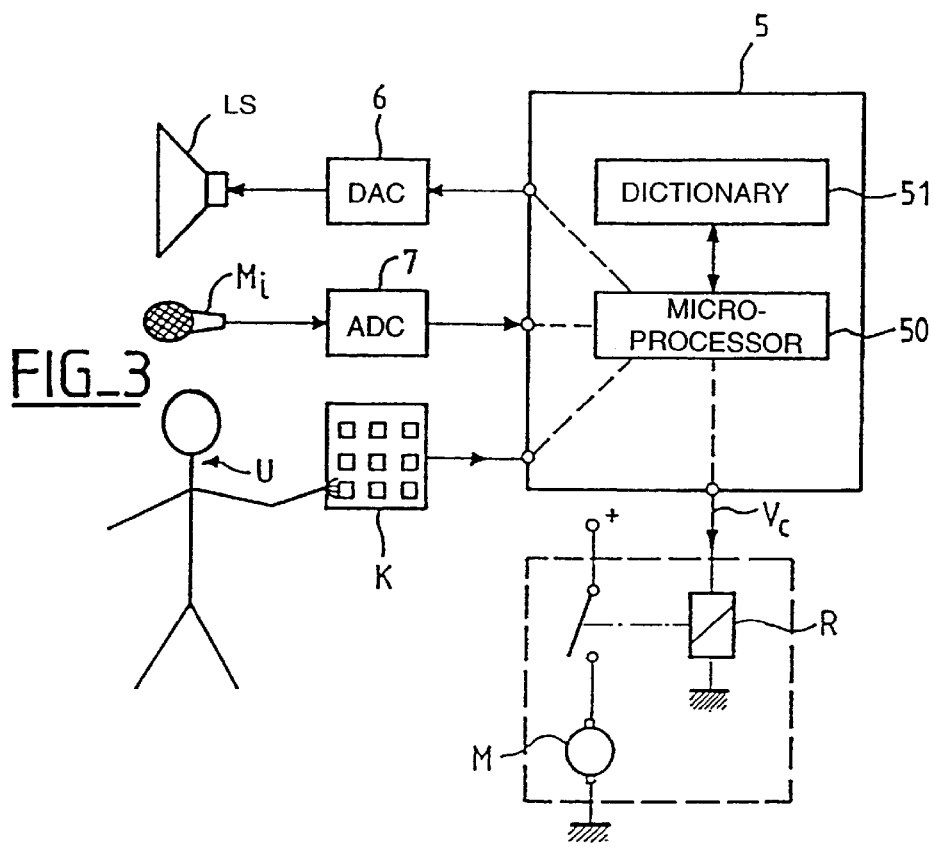
FIG_3
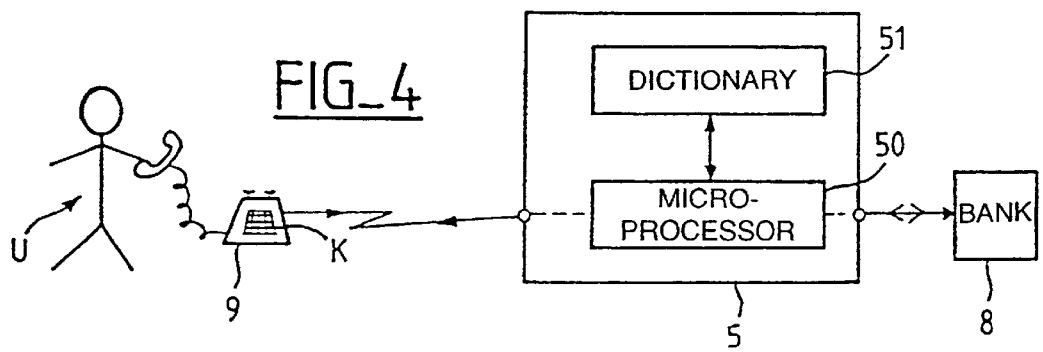
FIG_4
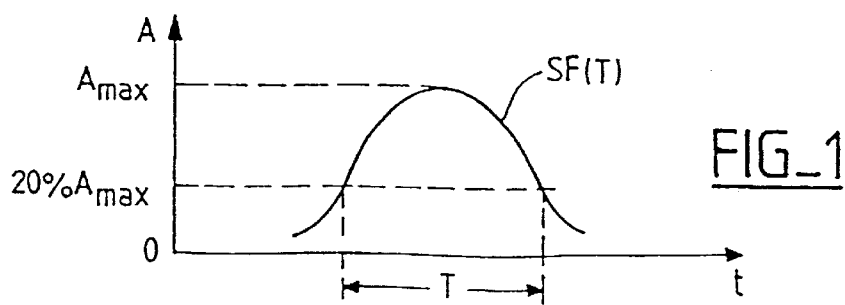
FIG_1

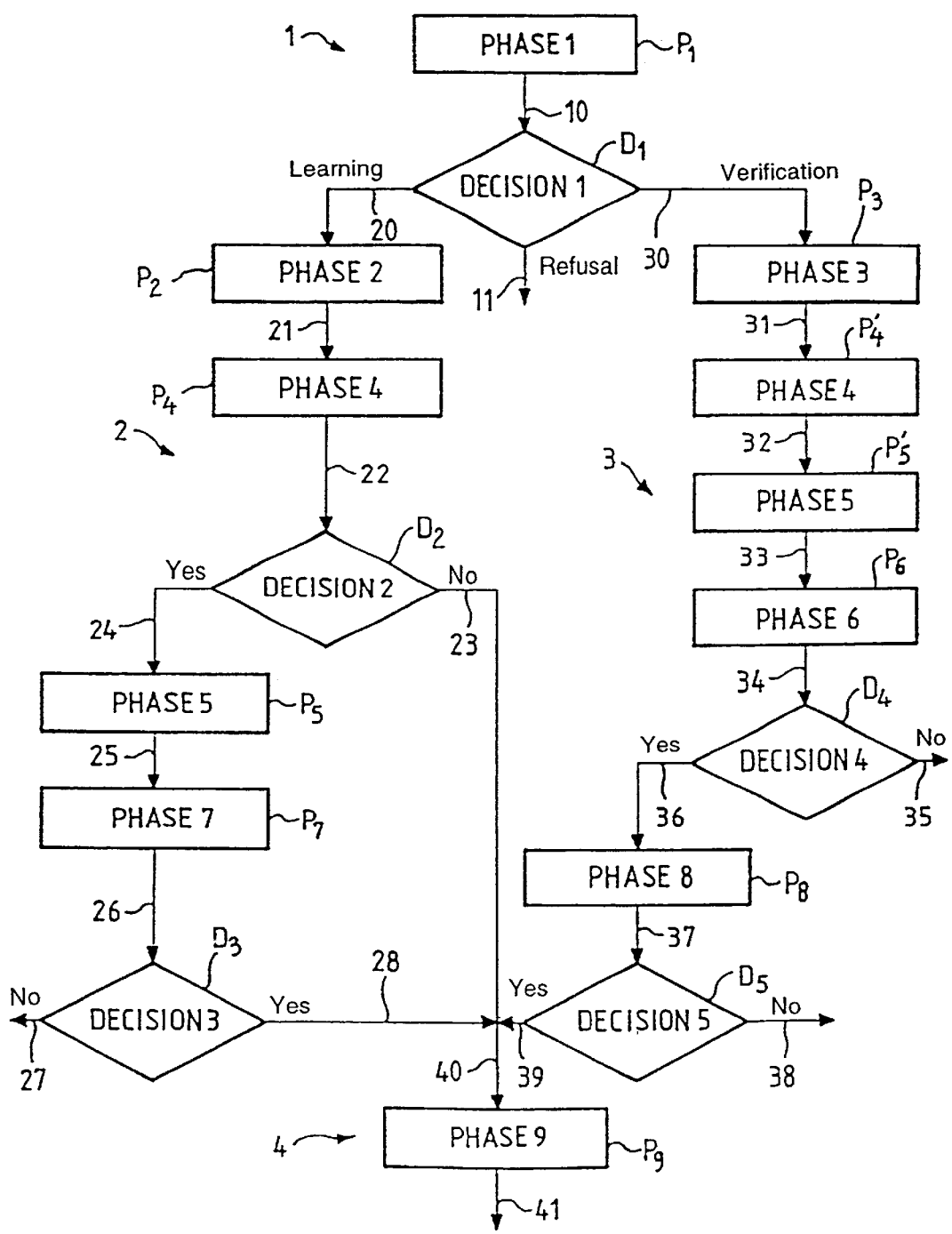

METHOD FOR THE VOICE RECOGNITION OF A SPEAKER USING A PREDICTIVE MODEL, PARTICULARLY FOR ACCESS CONTROL APPLICATIONS

SUMMARY OF THE INVENTION

BACKGROUND OF THE INVENTION

1. Field of the Invention

The invention concerns a method for the voice recognition of a speaker using a predictive model.

It is more particularly concerned with a method for the voice recognition of a speaker using a vector autoregressive type predictive model.

The method applies equally well to identifying a speaker and to identifying changes of speakers.

It finds applications in many fields and more particularly in access control. Access control is effected by verifying one or more utterances of a speaker.

It finds one particular, although not exclusive, application in the following two fields: access authorization using a sound lock and authorization of access to confidential information: validation of financial operations and/or transactions, secure access to remote information services, etc.

2. Description of the Related Art

The prior art methods usually include a learning mode and a verification mode. They include some or all of the following phases and steps: identity declaration and service request steps (phase 1), steps authorizing learning of one or more utterances for a speaker (phase 2), steps authorizing verification of one or more utterances for a speaker (phase 3), steps of extracting statistical characteristics of one or more utterances (phase 4), steps of calculating the predictive model from statistical characteristics of one or more utterances (phase 5), steps of verification of the identity from the utterance (phase 6), phases of identifying the speaker from the utterance (phase 7), steps of authorizing access to all or some of the resources requested in the first phase (phase 8) and steps of updating the dictionary of statistical characteristics and the predictive model corresponding to some or all of the utterances of a speaker (phase 9).

The first phase enables the speaker to declare an identity and to request an operating mode (learning or verification) with the aim of accessing one or more resources.

The second phase enables a speaker to use the learning mode of the access device.

The third phase enables each speaker to use the verification mode of the access device.

The fourth phase includes a step of digital acquisition and filtering of one or more utterances, a step of extracting vectors of size p, a step of calculating q+1 correlation matrices of size p×p of some or all of the calculated vectors. The q+1 matrices constitute the statistical characteristics of the utterance of the speaker.

The fifth phase includes a step of calculating q prediction matrices of size p×p from the correlation matrices, a step of calculating the inverse of the associated error matrix. These q+1 matrices constitute the predictive model of the utterance of the speaker. The references of the utterance of a speaker comprise the statistical characteristics and the associated predictive model.

The sixth phase includes a step of calculating measured resemblances between the statistical characteristics of one or more utterances and some or all of the utterance references from the dictionary and a step of calculating the probability of identity verification.

The seventh phase includes a step of calculating measured resemblances between statistical characteristics of one or more utterances and some or all of the references from the dictionary, a step of searching for the references nearest the utterance and a step of calculating the probability of the identification of the speaker.

The eighth phase authorizes access to some or all of the resources requested in the first phase.

The ninth phase is used to update the references of the utterance of a speaker in the dictionary or to add references of a new speaker to the dictionary.

Automatic verification of the speaker consists in verifying the identity of a person in accordance with a voice sample. Two decisions are possible, in accordance with a binary scheme: "authentication" or "non-authentication of identity".

BACKGROUND OF THE INVENTION

Of the many prior art documents relating to speaker verification methods, the article by Claude Montacié and Jean-Luc Le Floch: "Discriminant AR-Vector Models for Free-Text Speaker Verification" published in "Congrès EuroSpeech 1993", pages 161–164, may be cited as one non-exhaustive example. The article discloses a method for automatically verifying the speaker but does not explain the conditions for extracting parameters for obtaining a system for automatic representation of the speaker that performs well, is fast and works in a noisy environment.

The above mentioned methods applying, as already indicated, equally to identifying a speaker or to detecting changes of speakers, it is necessary to take account of the physiological characteristics of the human voice, among other factors. In particular, according to whether a man or woman is speaking, the fundamental periods of complex voice signals respectively correspond to frequencies around 100 Hz and 200 Hz. Time windows defined hereinafter are used during the fourth phase mentioned above. In the speech processing art it is accepted that the time windows must be larger than the aforementioned fundamental period. In other words, the analysis applies to a period greater than the fundamental period. As a result the windows usually employed are typically in the range from 15 ms to 40 ms. Trials have shown that performance begins to drop off if this time interval is reduced.

Also, a plurality of overlapping windows are usually employed. It is also accepted that the spacing between two consecutive windows, defined as the time period between the centers of the windows, must be in the order of approximately 10 ms, or more.

BRIEF SUMMARY OF THE INVENTION

Surprisingly, it has been found that adopting values much lower than the aforementioned values improved performance and obtained better results.

To be more precise, in accordance with the invention, the duration of the window must be less than 10 ms.

The fundamental period being around 5 ms for women and 10 ms for men, a window equal to the average fundamental period (i.e. 7.5 Ms) is preferably chosen.

Similarly, the window spacing chosen is less than 4.5 ms.

Values much lower than this value are preferably chosen, for example 2 ms.

BRIEF DESCRIPTION OF THE INVENTION

The present invention therefore concerns a method for the voice recognition of a speaker using a predictive model which offers improved performance while retaining the technical characteristics and the advantages of the prior art methods.

The method in accordance with the invention is particularly suited to predictive models of the vector autoregressive type.

The invention therefore consists in a method for the voice recognition of a speaker using a q-order predictive model comprising at least one phase of extracting statistical characteristics including at least one step of digital acquisition of a voice sample of particular duration D of the speaker corresponding to at least one utterance of the speaker, a step of converting said voice sample into a sequence of vectors of particular size p obtained from a sequence of analysis windows of average size T and with average spacing I, and a step of determining q+1 correlation matrices from this sequence of vectors, where p and q are non-zero integers, characterized in that said average size T has a duration less than 10 ms.

It also consists in the application of a method of the above kind to identifying a speaker or to detecting changes of speakers.

It further consists in the application of the above method to access control using a sound lock.

It finally consists in the application of the above method to controlling access to confidential information, in particular validation of financial operations and/or transactions, secure access to remote information services.

BRIEF DESCRIPTION OF THE DRAWINGS

The invention will be better understood and other features and advantages will become apparent on reading the following description given with reference to the accompanying drawings, in which:

FIG. 1 shows one example of a window signal;

FIG. 2 is a flowchart used in the detailed description of the method of the invention;

FIG. 3 shows the application of the method of the invention to access control using a sound lock;

FIG. 4 shows the application of the method of the invention to controlling remote access to confidential information.

DETAILED DESCRIPTION OF THE INVENTION

As previously indicated, the method of the invention retains the general characteristics of the prior art methods. To give a clear idea of the invention, without in any way seeking to limit the scope of the invention, the following description refers to the specific context of a vector autoregressive type predictive model.

The method of the invention is more particularly concerned with three major families of operations: extracting statistical characteristics of a voice sample specifically suited to vector autoregressive predictive models, calculating measured resemblances between voice samples and updating the speaker reference dictionary. These major families of operations will now be described.

This part of the method characterizes a voice sample by means of q+1 p×p order correlation matrices calculated from a set of vectors of size p. The method of obtaining the vectors is related to the aforementioned phase 4 and includes features specific to the invention.

Before describing in detail the operations associated with extracting statistical characteristics of a voice sample it is necessary to define the terminology employed.

A voice sample is any representation of an acoustical signal (for example: acoustical, electrical, physical, magnetic, optical, etc). Any subset of a voice sample is a voice sample. Any concatenation of voice samples is a voice sample.

Digital acquisition of the voice sample is the conversion of the analog signal representing the voice sample of duration D into a sequence of N numerical values $\{x_i\}$ (i=1, ... ,N) at increasing sampling times $\{t_i\}$ (i=1, ... ,N).

Digital filtering is the conversion of a sequence of N numerical values $\{x_i\}$ (i=1, ... ,N), at sampling times $\{t_i\}$ (i=1, ... ,N), into a sequence of N' numerical values $\{x'_i\}$ (i=1, ... ,N') at increasing sampling times $\{t'_i\}$ (i=1, ... ,N'). The sequence of numerical values $\{x_i\}$ (i=1, ... ,N) can be subjected to many types of filtering, if required. In this case the new sequences of numerical values are used.

The analysis window F is a discrete function f of value $\{f_i\}$ (i=1, ... ,N) at times $\{t_1\}$ (i=1, ... ,N). The analysis window F is associated with digital acquisition (and any filtering) of the voice sample. Examples are rectangular windows, Hamming windows, etc.

The maximum M of an analysis window F is defined by the equation:

$$M = \max_{i=1,...,N} |f_i|$$

The zone Z of an analysis window F is the discrete function $f_Z$ of values $\{f_{Z_i}\}$ (i=1, ... ,$N_Z$) with $f_{Z_i}=f_{Z(i)}$ and $N_Z \leq N$, Z(i) being a discrete function of the form $Z(i)=i+D_Z$, $D_Z$ being an integer value in the range 0 to N–$N_Z$.

The zone Z of type A of analysis window F is the zone Z which satisfies:

$$\forall i \epsilon \{1, ... ,N_Z\} | f_{Z_i} | > M/5$$

The zone Z of type B of analysis window F is the zone Z which satisfies:

$$\forall i \epsilon \{1, ... ,N_Z\} | f_{Z_i} | > M/5$$

An analysis window F can be divided into zones of type A or B.

The duration of a zone Z is equal to $t_{Z(N_Z)}-t_{Z(1)}$.

Zone $Z_F$ is a zone of type A of greater duration over all decompositions of F.

The duration of the analysis window F is the duration of $Z_F$.

The center of the analysis window F is defined by the equation:

$$C_F = \sum_{t_i \in Z_F} t_i \times f_i \Big/ \sum_{t_i \in Z_F} f_i$$

A voice sample $\{x_i\}$ (i=1, ... ,N), windowed by the analysis window F, is a set of N numerical values $\{x_{f_i}\}$ (i=1, ... ,N), such that $x_{f_i}=x_i \times f_i$.

The spacing between two analysis windows $F_1$ and $F_2$ is defined by the equation:

$$I_{F_1 F_2} = C_{F_2} - C_{F_1}$$

The set of windows (T, I, N, D) is the sequence of $N_F$ successive analysis windows $\{F_j\}$ (j=1, ..., $N_F$) of length N, with $N_F \leq (D-T)/I$ where T is the average duration of the analysis window and I is the average spacing between two analysis windows. The set of windows (T, I, N, D) is associated with the digital acquisition (and any filtering) of the voice sample.

The extraction of a vector of size p is the function calculating a vector $y_F$ of size p from a voice sample $\{x_i\}$ (i=1, ..., N) windowed by the analysis window F. All non-null $\{x_{f_i}\}$ (i=1, ..., N) must be used in calculating this function, in other words significant modification of any of the non-null values of the set $\{x_{f_i}\}$ (i=1, ..., N) must modify the result of the function in a significant manner. The following parameterizations can be used, for example: Fourier transform, cepstrum, linear prediction, etc.

The set of vectors ($\{x_i\}$, p, T, I, N, D) is a series of $N_F$ vectors $\{y_{F_j}\}$ (j=1, ..., $N_F$) calculated from a set of windows (T, I, N, D).

The correlation matrices of a voice sample ($\{x_i\}$, p, q, T, I, N, D) are a set of q+1 matrices $\{R_m\}$ (m=0, ..., q) of size p×p such that the following equation is satisfied:

$$R_m = \sum_{j=1}^{N_F - m} y_{F_j} y_{F_{j+m}}^T$$

They can be normalized in any way, if necessary.

The fourth phase of the method of the invention consists in determining parameters (p, q, T, I) obtaining the best possible statistical characteristics for the predictive model used of a voice sample in terms of speaker verification.

The parameter p can have any value, but its value is generally in the range 6 to 30.

In accordance with one important feature of the invention, T is less than 10 ms and I is less than 4.5 ms.

It is well known that signals of the above kind are never perfect. FIG. 1 is a schematic illustration of a time signal SF(t) representing a window in an orthonormal system of axes "Amplitude A–Time t". The width of the window can be defined by the time interval T separating the intersections of a straight line parallel to the time axis with the curve representing the signal SF(t), at 20% of the maximum amplitude $A_{max}$, for example.

Also, q, T and I must be related by:

$I < T/\max(3, q)$

For example, if q=4 and T=8 ms, I must be less than 2 ms.

Generally, the higher the value of the parameter q the better the statistical characteristics obtained. However, this improvement is obtained at the cost of an increased computation overhead. Also, in a practical implementation, q is generally chosen in the range 1 to 10, which represents a good compromise.

The invention also concerns measured resemblances between voice samples used in the aforementioned phases 6 and 7. The calculation of the predictive model will be described in detail using the statistical characteristics of one or more utterances of the speaker, which constitutes phase 5.

The measured resemblances are based on calculating predictive models and associated error matrices.

As before, it is useful to begin by defining the terminology used.

The direct prediction of the vector $y_{F_j}$ is equal to $\hat{y}_{F_j}^D$
The retrograde prediction of the vector $y_{F_j}$ is equal to $\hat{y}_{F_j}^R$
The direct vectorial predictive model ($\{x_i\}$, p, q, T, I, N, D) of a set of vectors ($\{x_i\}$, p, T, I, N, D) is the set of q matrices $\{A_m\}$ (m=1, ..., q) of size p×p calculated from the correlation matrices $\{R_m\}$ (m=0, ..., q). The aim is the best possible prediction of a vector $y_{F_j}$ from the preceding q vectors:

$$\hat{y}_{F_j}^D = \sum_{m=1}^{q} A_m y_{F_{j-m}}$$

The retrograde vector predictive model ($\{x_i\}$, p, q, T, I, N, D) of a set of vectors ($\{x_i\}$, p, T, I, N, D) is the set of q matrices $\{B_m\}$ (m=1, ..., q) of size p×p calculated from the correlation matrices $\{R_m\}$ (m=0, ..., q). The aim is to predict the best possible vector $y_{F_j}$ from the following q vectors:

$$\hat{y}_{F_j}^R = \sum_{m=1}^{q} B_m y_{F_{j+m}}$$

The direct error $\epsilon_j(\{x_i\}, p, q, T, I, N, D, \{A_m\})$ over a set of vectors ($\{x_i\}$, p, T, I, N, D) by a direct predictive model ($\{x_i\}$, p, q, T, I, N, D) is equal to the inverse filtering of a set of vectors ($\{x_i\}$, p, T, I, N, D) by a direct predictive model $\{A_m\}$ (m=1, ..., q) such that the following equation is satisfied:

$$\varepsilon_j = YF_j - \sum_{m=1}^{q} A_m YF_{j-m}$$

The retrograde error $\xi_j(\{x_i\}, p, q, T, I, N, D, \{B_m\})$ over a set of vectors ($\{x_i\}$, p, T, I, N, D) by a retrograde predictive model ($\{x_i\}$, p, q, T, I, N, D) is equal to the inverse filtering of a set of vectors ($\{x_i\}$), p, T, I, N, D) by a retrograde predictive model $\{B_m\}$ (m=1, ..., q) such that the following equation is satisfied:

$$\xi_j = y_{F_j} - \sum_{m=1}^{q} B_m y_{F_{j+m}}$$

The direct error matrix $E_A$ ($\{x_i\}$, p, q, T, I, N, D, $\{A_m\}$) of the direct error ($\{x_i\}$, p, q, T, I, N, D, $\{A_m\}$) is equal to the covariance matrix of size p×p of the direct error ($\{x_i\}$, p, q, T, I, N, D, $\{A_m\}$) such that the following equation is satisfied:

$$E_A = \sum_{j=1}^{N_F} \varepsilon_j \varepsilon_j^T$$

The retrograde error matrix $E_B$ ($\{x_i\}$, p, q, T, I, N, $\{B_m\}$) of the retrograde error ($\{x_i\}$, p, q, T, I, N, D, $\{B_m\}$) is equal to the covariance matrix of size p×p of the retrograde error ($\{x_i\}$, p, q, T, I, N, D, $\{B_m\}$) such that the following equation is satisfied:

$$E_B = \sum_{j=1}^{N_F} \xi_j \xi_j^T$$

For calculating direct predictive models $\{A_m\}$ (m=1, ..., q) or retrograde predictive models $\{B_m\}$ (m=1, ..., q), the Levinson-Whittle-Robinson algorithm which minimizes the trace of $E_A$ and $E_B$ may be cited by way of non-limiting example, and is set out as follows:

$$A_0^0 = I_d; \quad B_0^0 = I_d; \quad E_{A0} = R_0; \quad E_{B0} = R_0;$$

for i=0 to q−1 do $$F_i = \sum_{m=0}^{i} A_m^i R_{i+1-m}$$

$$K_{Ai} = -F_i E_{Bi}^{-1}; \quad K_{Bi} = -F_i^T E_{Ai}^{-1};$$

$$E_{Ai+1} = (I_d - K_{Ai} K_{Bi}) E_{Ai};$$

$$E_{Bi+1} = (I_d - K_{Bi} K_{Ai}) E_{Bi};$$

$$A_0^{i+1} = A_0^i; \quad B_0^{i+1} = K_{Bi} A_0^i;$$

$$A_{i+1}^{i+1} = K_{Ai} B_i^i; \quad B_{i+1}^{i+1} = B_i^i;$$

for m=1 to i do $$A_m^{i+1} = A_m^i + K_{Ai} B_{m-1}^i$$

$$B_m^{i+1} = B_{m-1}^i + K_{Bi} A_m^i$$

end for
end for
for m=1 to q do $A_m = A_m^q$ end for
for m=1 to q do $B_m = B_m^q$ end for The following definitions and notation apply to the direct predictive model:

a/ $\{x1_i\}$ (i=1, . . . ,$N_1$) is the set of $N_1$ digital values of voice sample 1;

b/ $\{R1_m\}$ (m=0, . . . ,q) represents q+1 correlation matrices for ($\{x1_i\}$, p, q, T, I, D);

c/ $\{A1_m\}$ (m=1, . . . ,q) is the q-order direct predictive model for ($\{1_i\}$, p, q, T, I, D);

d/ $\{x2_i\}$ (i=1, . . . ,$N_2$) is the set of $N_2$ numerical values of voice sample 2;

e/ $\{R2_m\}$ (m=0, . . . ,q) represents q+1 correlation matrices for ($\{x2_i\}$, p, q, T, I, D);

f/ $\{A2_m\}$ (m=1, . . . ,q) is the q-order direct predictive model for ($\{x2_i\}$, p, q, T, I, D);

g/ $E_{A\,11}$ is the direct error matrix ($\{x1_i\}$, p, q, T, I, D, $\{A1_m\}$);

h/ $E_{A21}$ is the direct error matrix ($\{x1_i\}$, p, q, T, I, D, $\{A2_m\}$);

i/ $E_{A12}$ is the direct error matrix ($\{x2_i\}$, p, q, T, I, D, $\{A1_m\}$);

j/ $E_{A22}$ is the direct error matrix ($\{x2_i\}$, p, q, T, I, D, $\{A2_m\}$).

The above matrices can be calculated directly using the following algorithm:

$$X_{A12} = \sum_{m=1}^{q} \left( \left( R2_m + \sum_{i=0}^{m-1} A1_{m-i} R2_m \right) + R2_m \right) A1_m^T$$

$$Y_{A12} = R2_0 + \sum_{m=1}^{q} A1_{m-i} R2_0 A1_m^T$$

$$E_{A12} = X_{A12} + X_{A12}^T + Y_{A12}$$

$$X_{A21} = \sum_{m=1}^{q} \left( \left( R1_m + \sum_{i=0}^{m-1} A2_m R1_{m-i} \right) + R1_m \right) A2_m^T$$

$$Y_{A21} = R1_0 + \sum_{m=1}^{q} A2_{m-i} R1_0 A2_m^T$$

$$E_{A11} = R1_0 + \sum_{m=1}^{q} A1_m R1_m^T$$

$$E_{A22} = R2_0 + \sum_{m=1}^{q} A2_m R2_m^T$$

G(E) is a function of the inherent values of a matrix E of size p×p. For example, G(E) can be equal to the sum of the inherent values (Trace(E)) or to the product of the inherent values (Determinaut(E)).

The measured resemblance between two voice samples is a function of $G(E_{A11} E_{A12}^{-1})$, $G(E_{A12}^{-1} E_{A11})$, $G(E_{A22} E_{A21}^{-1})$ and $G(E_{A21}^{-1} E_{A22})$ A weighted sum can be chosen, for example.

The measured resemblance can also be defined on the basis of retrograde models or by mixing the two types of modeling.

The method of the invention also concerns updating of the reference dictionary, i.e. of the statistical characteristics (correlation matrices) and predictive models. The statistical characteristics are updated by any possible function able to obtain a new set of correlation matrices $\{R_m\}$ from two sets of correlation matrices. The two sets of correlation matrices are that of the dictionary $\{R1_m\}$ and that from one or more new utterances $\{R2_m\}$.

By way of non-limiting example, the new set of correlation matrices $\{R_m\}$ can be obtained from the following equation:

$$R_m = \alpha R1_m + \beta R2_m + \gamma \sqrt{R1_m R2_m} \quad (m=0, \ldots, q)$$

The method of the invention will now be described in detail with reference to the FIG. 2 flowchart. The flowchart has two main branches stemming from a common trunk 1: the left branch concerns learning (branch 2) and the right branch concerns verification (branch 3). Phases 1 through 9 labeled $P_1$ through $P_9$ relate to phases 1 to 9 previously described. A number of intermediate decisions $D_1$ through $D_5$ are taken during the execution of the phases of the method.

During phase 1 ($P_1$) the speaker declares an identity using the means made available. He can type in a code known only to him or use a magnetic stripe card or similar means. He then requests one of two modes of operation, learning or verification, with the aim of accessing one or more resources.

At the end of phase $P_1$ (output 10) a first decision $D_1$ is taken. The decision $D_1$ relates to acceptance of learning (branch 20) or verification (branch 30) for access to the resources requested in phase $P_1$. For example, learning can be substituted for verification if the learning is deemed insufficient or a refusal can be indicated (branch 11) if the requested operating mode or resources are not available.

The aforementioned resources naturally depend on the particular application envisaged. Examples will be described hereinafter.

Assuming that decision $D_1$ has switched the process to the "Learning" branch 2 (branch 20 of $D_1$), phase 2 ($P_2$) is initiated.

Phase $P_2$ initiates all the actions used to learn a reference of one or more utterances of the speaker whose identity has been declared. Depending on the particular application, it can be a question of voice entry activation, dictionary research, etc.

At the end of phase $P_2$ (output 21), the process in the "Learning" branch 2 goes directly to phase 4 ($P_4$).

During phase $P_4$ the extraction of statistical characteristics proceeds in three steps, as previously described. The first step consists in the digital acquisition and possible filtering of the voice sample corresponding to one or more utterances. The second step converts it into a sequence of vectors obtained from a sequence of analysis windows of average size T and with average spacing I, in accordance with one of the main features of the invention. The third step calculates q+1 correlation matrices from the above series of vectors.

At the end of phase $P_4$ (output 22) a second decision $D_2$ is taken. During learning, identification of the identity of the speaker can be decided to assure their identity with updating of their utterance references. If the decision is "no" (branch 23), phase 9 ($P_9$) is initiated directly. Phase $P_9$ will be described hereinafter. Otherwise: decision "yes" (branch 24), phase 5 ($P_5$) is initiated.

Phase $P_5$ is carried out in two steps. The first step consists in calculating q prediction matrices from the statistical characteristics (correlation matrices) of one or more utterances. There are a number of choices for calculating a predictive model: direct predictive model, retrograde predictive model or a combination of the two models. The second step calculates the inverse of the error matrix between the sequence of vectors calculated from the voice sample of one or more utterances and the predictive model calculated from the same vectors. This set of q+1 matrices defines the predictive model of the utterance of the speaker. The references of the utterance of a speaker consist of the statistical characteristics and the associated predictive model.

In this "Learning" branch 2, at the output 25 from phase $P_5$, phase 7 ($P_7$) is initiated directly, bypassing phase 6 ($P_6$).

Phase $P_7$ comprises four steps. The first step consists in extracting a dictionary containing the references of all possible speakers. The second step consists in calculating error matrices between the references previously selected and the references (or the statistical characteristics alone) of the voice sample to be identified. The third step consists in calculating measured resemblances from the error matrices calculated in the previous step. The fourth step calculates the probability of the identification of the speaker from the measured resemblances calculated in the third step.

At the output from phase $P_7$ a third decision $D_3$ is taken. The decision $D_3$ concerns the adequacy of the identity resulting from the identification in phase $P_7$ and the identity declared in phase $P_1$. If the result is not adequate: "no" branch 27, the process is halted. Action can then be taken at this level, depending on the application.

Otherwise: "yes" branch 28, the process continues along a trunk 40 common to branches 23 (decision $D_2$) and 28 (decision $D_3$) and to branch 39 (decision $D_5$) to be explained later. Phase 9 ($P_9$) is then initiated.

Phase 9 updates the references of the utterance of a speaker from the dictionary or adds those of a new speaker to the dictionary. The updating of the references includes a step of extracting from the dictionary q+1 correlation matrices of a speaker, a step of calculating and storing in the dictionary q+1 new correlation matrices by accumulation of the old matrices and those extracted from one or more utterances, a step of calculating and storing in the dictionary the predictive model corresponding to the new correlation matrices. Adding the references of the utterance of the new speaker to the dictionary consists in storing the q+1 correlation matrices of the speaker and the corresponding predictive model.

At the output 41 from phase $P_9$ an action dependent on the intended application can be taken. The process is usually halted, the system being updated for the current speaker or ready to recognize him, in the case of a new speaker.

Consider now the "Verification" branch 3 (output 30 from decision $D_1$): the method initiates phase 3 ($P_3$) directly.

Phase $P_3$ initiates all actions for verifying the speaker whose identity has been declared. As in phase $P_2$, depending on the particular application, it can be a question of sound entry activation, dictionary research, etc.

At the output 31 from phase $P_3$ phase $P'_4$ is initiated. Phase $P'_4$ is identical to phase $P_4$ of the "Learning" branch 2 and there is no point in describing it again.

Similarly, at the output 32 from phase $P'_4$ phase $P'_5$ is initiated, phase $P'_5$ being identical to phase $P_5$ of the "Learning" branch 2.

At the output 33 from phase $P'_5$ phase 6 ($P_6$) is initiated.

Phase $P_6$ includes four steps. The first step extracts from the dictionary the references of some or all speakers (for example the K closest references in the sense of a measured resemblance). The second step calculates error matrices between some or all of the references previously selected and the references (or the statistical characteristics alone) of the voice sample to be verified. The third step consists in calculating the measured resemblances from some or all of the error matrices calculated in the previous step. The fourth step calculates the probability of the verification of the speaker from the measured resemblances calculated in the third step.

At the output 34 from phase $P_6$ a fourth decision $D_4$ is taken (the first decision in the "Verification" branch 3). This decision concerns the authentication or non-authentication of the identity of the speaker in verification mode.

If the authentication is negative: "no" branch 35, the process is halted or an action that depends on the particular application can be taken. For example, this can consist in confiscating the magnetic stripe card inserted in phase $P_1$, tripping an audible alarm, etc.

Otherwise: "yes" branch 36, phase 8 ($P_8$) is initiated.

Phase $P_8$ authorizes access to some or all of the resources requested by the speaker in the first phase. For example, depending on the particular application, it can be a question of opening a door, allowing access to confidential information, etc.

A fifth decision $D_5$ can also be taken at this stage (output 37 from phase $P_8$).

Decision $D_5$ concerns the possible updating of the utterance references of the speaker in the case of very good authentication of their identity in verification mode (branch 3).

If the result of decision $D_5$ is "no" (branch 38) the process will terminate in most cases.

Otherwise ("yes" branch 39) the process is again switched to the exit branch 4 (common trunk 40) and phase $P_9$ is executed. This phase has already been described and there is no need to describe it again.

As for the "Learning" branch 2, at the output 41 from phase $P_9$ action can be taken that naturally depends on the intended application. The process usually halts, the system being updated for the current speaker and the latter having access to the requested resources (phase $P_8$).

A first example of application of the method of the invention will now be described with reference to FIG. 3.

The intended application concerns protecting access to premises by means of a sound lock or controlling equipment of any kind to which access is restricted to authorized persons.

It is assumed that the speaker U declares their identity by means of a keypad K of the type used to unlock a door. To this end the speaker must enter a code into the system 5 implementing the method of the invention. Other means could have been used: magnetic stripe badge, smart card, etc.

The system includes circuits common in themselves to the prior art. It includes a dictionary 51 in which data used to verify known speakers is stored and a microprocessor 50 or any appropriate data processing system for performing the various calculations and determinations previously described. In the current state of the art such calculations are effected under the control of programs stored in Read Only Memory (ROM or EPROM) for example) and/or in a backing store (hard disk), not shown in FIG. 3.

For simplicity, it will be assumed at this stage that only one mode of operation is possible: verification mode.

In addition to the keypad K, means can be provided for guiding the speaker, for example a loudspeaker LS controlled by the system 5 via a digital-analogue converter 6. Instructions can be given to the speaker U by this means. A display screen could be provided instead, for example a liquid crystal display, giving the same instructions and advising on the progress of the operations and the results of the various decisions taken by the system 5.

Finally, a microphone $M_i$, or any appropriate electro-acoustic transducer is provided to pick up the voice of the speaker U. An analog-digital converter 7 converts the electrical output signals of the microphone 7 into digital signals that can be read by the microprocessor 50. To this end the output of he converter 7 can be connected to a parallel or serial port (this is well known in itself).

When the code has been entered on the keypad K the system 5 acquires data on the presumed identity of the requester, i.e. the speaker U. Phase $P_3$ and the subsequent phases, and in particular phase $P'_4$ (phase 4) can be initiated and executed up to the point where a decision is taken by the system 5: decision $D_4$ at the output from phase $P_6$.

If the decision is favorable (FIG. 2, branch 36) phase P8 is executed and the speaker has access to the requested resources, for example access to premises with a door provided with an electric lock symbolized by a motor M in FIG. 3. For simplicity it is assumed that the supply of electrical energy to the lock is controlled by a relay R controlled by an electrical signal $V_C$ delivered by the system 5.

At the end of phase $P_8$ the process can halt (FIG. 2, branch 38, as a result of the decision $D_5$) or proceed to phase $P_9$, during which the dictionary 51 will be updated for the speaker U.

Although it has been assumed that the system provides only one mode of operation: the "Verification" mode that is better suited to this type of application, the "Learning" mode can equally be installed. For example, it will be sufficient to provide a special key on the keypad K to enable a choice between the two modes or to duplicated the code entry and voice acquisition devices elsewhere.

In this case it is necessary to implement the circuits and instructions for switching the process to branch 2 or 3 (FIG. 2: decision $D_1$) and to execute the phases (FIG. 2: $P_2$, $P_4$, $P_5$ and $P_7$) and decisions (FIG. 2: $D_2$ and $D_3$) specific to branch 2.

A second series of applications of the method of the invention will now be described with reference to FIG. 4.

The intended applications concern secure access to remote information. For example, it may be a question of validating financial (bank, stock exchange, etc) operations and transactions.

In this type of application it is a question of identifying with certitude the person requesting service or giving the instruction (aforementioned case of bank, stock exchange, etc transactions).

As the person concerned is not near the decision center, they enter their request using a standard telephone if they do not have secure data communication means, which are outside the scope of the present invention.

FIG. 4 is a schematic illustration of the architecture of a system using the method of the invention for secure transactions. Here the term "transactions" is used in the broadest sense encompassing the various definitions given hereinabove.

The speaker U uses a telephone 9 to call a "reserved information center" 8. For example, this can be their bank or any similar organization (stockbroker, etc).

To make the example more concrete, it will be assumed that the speaker wants to give an instruction to transfer a given amount from their account to another account. The data that it is most important to authenticate is of course the identity of the person giving the instruction. The usual techniques such as passwords or similar techniques can be used, or the bank can call the caller back on a number agreed previously in order to assure the identity of the caller. Such techniques are of limited security, however.

A call of the above type will be switched to a system 5 for verifying the identification of the speaker U similar to the system 5 from FIG. 3. In another variant, as shown by FIG. 4, telephone numbers are reserved for this type of call and the call is connected directly to a specialist center (not shown) connected to the system 5.

The system 5 can "welcome" the speaker and guide them through subsequent operations, for example using a voice synthesizer (not shown).

It is assumed that the telephone includes a keypad K with number keys so the speaker U can enter a personal identification number using the keypad. This initiates phase $P_1$ of the process.

The PIN could equally be entered using a "MINITEL" type terminal provided with a card reader.

The aforementioned voice synthesizer can then request the speaker to speak one or more phrases enabling execution of other phases specific to the "Verification" branch (FIG. 2: 3), unless there is an immediate refusal (FIG. 2: decision $D_1$, "Refusal" branch 11). This possibility exists if the code entered on the keypad is not recognized by the system: wrong code or attempted fraud. In the conventional way, a limited number of attempts can be allowed (for example three attempts). Each unsuccessful attempt will loop to phase $P_1$. At the end of the Nth unsuccessful attempt (N being the maximum number), the link can be cleared down and a record of the call stored in memory.

If the verification phases proceed normally, at the end of phase $P_8$ the identity of the speaker will have been formally verified as their voice will have been recognized. This is therefore the equivalent of an "electronic signature", in this instance a sound equivalent. Trials have shown that the level of security is very high in that the success rate (recognition) is in the order of 99% for several hundred speakers. Also, it must be clearly understood that the context of the text to be spoken is unrestricted. Finally, in the event of non-recognition, the system does not provide access to the wanted resources.

In the example described the system 5 can provide access to an automated system or to a physical person 8.

In the former case, the speaker U can use the keys of their keypad K to transmit instructions or requests. In the latter case they can converse directly with the other party, who is certain of the identity of the caller U. The speaker U can equally be connected to a voice server, for example to obtain restricted information (the balance of their account, etc).

This system therefore enables remote execution of a great many operations and all kinds of information to be obtained with maximal security.

A reading of the foregoing description makes it clear that the invention achieves the stated objectives.

It must be understood that, although particularly well suited to the two series of applications described in detail with reference to FIGS. 3 and 4, the invention is not restricted to this type of application alone.

It finds many other applications and in particular:

Indexing of multimedia data in terms of verifying the speaker, identifying the speaker and detecting changes of speakers;

Biometric identification used for legal purposes, verification and validation of clauses in agreements, manufacture of identity cards;

Surveillance of communication channels.

What is claimed is:

1. A method for the voice recognition of a speaker using a q-order predictive model comprising at least one phase of extracting statistical characteristics ($P_4$, $P'_4$) including at least one step of digital acquisition of a voice sample of a particular duration D of the speaker (U) corresponding to at least one utterance of the speaker (U), a step of converting said voice sample into a sequence of vectors of particular size p obtained from a sequence of analysis windows of average duration T and with average spacing I, and a step of determining q+1 correlation matrices of size p×p from this sequence of vectors, where p and q are non-zero integers, characterized in that said average duration T has a duration less than 10 ms.

2. A method according to claim 1, characterized in that said average spacing I has a duration less than 4.5 ms.

3. A method according to claim 2, characterized in that said average spacing I, said average duration T and said order q of the predictive model are related as follows:

$I < T / \max(3, q)$

4. A method according to claim 1, characterized in that, said correlation matrices and said corresponding predictive model being stored in at least one dictionary (51), it includes a phase ($P_9$) of updating one of said dictionaries (51) for a particular speaker (U) including at least a first step of extracting from a dictionary (51) said q+1 correlation matrices of said speaker, a second step of determining a new sequence of q+1 correlation matrices from vectors of size p obtained by converting a new voice sample of the speaker into said sequence of vectors and a third step of determining a sequence of q+1 updated correlation matrices consisting in accumulating and storing in one of said dictionaries (51) the q+1 correlation matrices extracted during the first step and the q+1 correlation matrices determined during the second step.

5. A method according to claim 4, characterized in that said third step further comprises determining a predictive model corresponding to the determination of the sequence of q+1 updated correlation matrices and storing it in said dictionary.

6. A method according to claims 1, characterized in that, said correlation matrices and said corresponding predictive model being stored in at least one dictionary (51), it comprises a sequence of learning phases ($P_2$, $P_4$, $P_5$, $P_7$, $P_9$) of statistical data associated with a new speaker (U), in that said sequence comprises at least one phase ($P_9$) including at least a first step of determining a new sequence of q+1 correlation matrices from vectors of size p obtained by converting a new voice sample of the new speaker (U) into said sequence of vectors, determining a predictive model corresponding to said sequence of q+1 correlation matrices and a second step consisting in storing in said dictionaries (51) the q+1 correlation matrices and the predictive model determined during the first step.

7. A method according to claim 1, characterized in that it comprises a sequence of phases ($P_3$, $P'_4$, $P'_5$, $P_6$, $P_8$) for verifying the identity of a speaker and in that said sequence comprises at least the following phases:

a phase ($P'_5$) of determining a predictive model including a first step consisting in determining, from said statistical characteristics of at least one utterance, q prediction matrices and a second step calculating the inverse of the error matrix between a sequence of vectors of dimension p calculated from the voice sample of each of the utterances and the predictive model calculated from these same vectors, the set of q+1 matrices defining the predictive model of the utterance of the speaker and the references of the utterance of a speaker consisting of said statistical characteristics and the associated predictive model;

a phase ($P_6$) of verifying the identity of said speaker including a first step during which utterance references of at least some speakers are extracted from a dictionary, a second step of calculating error matrices between at least some of the utterance references previously extracted and the utterance references of the voice sample to be verified, a third step consisting in calculating measured resemblances from at least some of the error matrices calculated during the second step and a fourth step of calculating the probability of the verification of said speaker from the measured resemblances calculated in the third step; and a phase ($P_8$) authorizing access to at least some of a set of predetermined resources previously requested by said speaker during a preliminary phase ($P_1$), when the verification of said identity is positive.

8. A method according to claim 1, characterized in that said predictive model is a vector autoregressive predictive model.

9. A system for secure access to a resource restricted to at least one authorized speaker, said system employing the method according to claim 7, characterized in that it comprises a sound lock responsive to a voice sample of a speaker (U) to be verified, the lock including at least one electroacoustic transducer ($M_i$) connected to a device (7) for converting the voice sample of said speaker into a digital signal, a stored program control calculation system (5, 50) connected to at least one dictionary (51) and receiving said digital signal to determine said utterance references of the voice sample to be verified, to verify the identity of the speaker (U) from said references and from utterance references stored in the dictionary (51), and to deliver a control signal ($V_c$) having at least two states, one state being representative of positive verification of the identity of an authorized speaker allowing access to said resource.

10. A system for secure access to a transaction restricted to at least one authorized speaker, said system employing the method according to claim 7, characterized in that it comprises at least one telephone device (9) including at least one electroacoustic transducer, the telephone device (9) transmitting over a telephone line at least one voice sample of a speaker (U) to be verified in a stored program control calculation system (5, 50) connected to at least one dictionary (51), the system determining said utterance references of the voice sample to be verified, verifying the identity of the speaker (U) from said references and from utterance references stored in the dictionary (51), and authorizing said transaction on positive verification of the identity of an authorized speaker.

11. A method according to claim 2, characterized in that, said correlation matrices and said corresponding predictive model being stored in at least one dictionary (51), it includes a phase $P_9$) of updating one of said dictionaries (51) for a particular speaker (U) including at least a first step of extracting from a dictionary (51) said q+1 correlation matrices of said speaker, a second step of determining a new sequence of q+1 correlation matrices from vectors of size p obtained by converting a new voice sample of the speaker into said sequence of vectors and a third step of determining a sequence of q+1 updated correlation matrices consisting in accumulating and storing in one of said dictionaries (51) the q+1 correlation matrices extracted during the first step and the q+1 correlation matrices determined during the second step.

12. A method according to claim 3, characterized in that, said correlation matrices and said corresponding predictive model being stored in at least one dictionary (51), it includes a phase ($P_9$) of updating one of said dictionaries (51) for a particular speaker (U) including at least a first step of extracting from a dictionary (51) said q+1 correlation matrices of said speaker, a second step of determining a new sequence of q+1 correlation matrices from vectors of size p obtained by converting a new voice sample of the speaker into said sequence of vectors and a third step of determining a sequence of q+1 updated correlation matrices consisting in accumulating and storing in one of said dictionaries (51) the q+1 correlation matrices extracted during the first step and the q+1 correlation matrices determined during the second step.

13. A method according to claim 2, characterized in that, said correlation matrices and said corresponding predictive model being stored in at least one dictionary (51), it comprises a sequence of learning phases ($P_2$, $P_4$, $P_5$, $P_7$, $P_9$) of statistical data associated with a new speaker (U), in that said sequence comprises at least one phase ($P_9$) including at least a first step of determining a new sequence of q+1 correlation matrices from vectors of size p obtained by converting a new voice sample of the new speaker (U) into said sequence of vectors, determining a predictive model corresponding to said sequence of q+1 correlation matrices and a second step consisting in storing in said dictionaries (51) the q+1 correlation matrices and the predictive model determined during the first step.

14. A method according to claim 3, characterized in that, said correlation matrices and said corresponding predictive model being stored in at least one dictionary (51), it comprises a sequence of learning phases ($P_2$, $P_4$, $P_5$, $P_7$, $P_9$) of statistical data associated with a new speaker (U), in that said sequence comprises at least one phase ($P_9$) including at least a first step of determining a new sequence of q+1 correlation matrices from vectors of size p obtained by converting a new voice sample of the new speaker (U) into said sequence of vectors, determining a predictive model corresponding to said sequence of q+1 correlation matrices and a second step consisting in storing in said dictionaries (51) the q+1 correlation matrices and the predictive model determined during the first step.

15. A method according to claim 2, characterized in that it comprises a sequence of phases ($P_3$, $P'_4$, $P'_5$, $P_6$, $P_8$) for verifying the identity of a speaker and in that said sequence comprises at least the following phases:

a phase ($P'_5$) of determining a predictive model including a first step consisting in determining, from said statistical characteristics of at least one utterance, q prediction matrices and a second step calculating the inverse of the error matrix between a sequence of vectors of dimension p calculated from the voice sample of each of the utterances and the predictive model calculated from these same vectors, the set of q+1 matrices defining the predictive model of the utterance of the speaker and the references of the utterance of a speaker consisting of said statistical characteristics and the associated predictive model;

a phase ($P_6$) of verifying the identity of said speaker including a first step during which utterance references of at least some speakers are extracted from a dictionary, a second step of calculating error matrices between at least some of the utterance references previously extracted and the utterance references of the voice sample to be verified, a third step consisting in calculating measured resemblances from at least some of the error matrices calculated during the second step and a fourth step of calculating the probability of the verification of said speaker from the measured resemblances calculated in the third step; and a phase ($P_8$ authorizing access to at least some of a set of predetermined resources previously requested by said speaker during a preliminary phase ($P_1$), when the verification of said identity is positive.

16. A method according to claim 3, characterized in that it comprises a sequence of phases ($P_3$, $P'_4$, $P'_5$, $P_6$, $P_8$) for verifying the identity of a speaker and in that said sequence comprises at least the following phases:

a phase ($P'_5$) of determining a predictive model including a first step consisting in determining, from said statistical characteristics of at least one utterance, q prediction matrices and a second step calculating the inverse of the error matrix between a sequence of vectors of dimension p calculated from the voice sample of each of the utterances and the predictive model calculated from these same vectors, the set of q+1 matrices defining the predictive model of the utterance of the speaker and the references of the utterance of a speaker consisting of said statistical characteristics and the associated predictive model;

a phase ($P_6$) of verifying the identity of said speaker including a first step during which utterance references of at least some speakers are extracted from a dictionary, a second step of calculating error matrices between at least some of the utterance references previously extracted and the utterance references of the voice sample to be verified, a third step consisting in calculating measured resemblances from at least some of the error matrices calculated during the second step and a fourth step of calculating the probability of the verification of said speaker from the measured resemblances calculated in the third step; and a phase ($P_8$) authorizing access to at least some of a set of predetermined resources previously requested by said speaker during a preliminary phase ($P_1$), when the verification of said identity is positive.

17. A method according to claim 3, characterized in that said predictive model is a vector autoregressive predictive model.

18. A method according to claim 7, characterized in that said predictive model is a vector autoregressive predictive model.

19. A system for secure access to a resource restricted to at least one authorized speaker, said system employing the method according to claim 8, characterized in that it comprises a sound lock responsive to a voice sample of a speaker (U) to be verified, the lock including at least one electroacoustic transducer ($M_t$) connected to a device (7) for converting the voice sample of said speaker into a digital signal, a stored program control calculation system (5, 50) connected to at least one dictionary (51) and receiving said digital signal to determine said utterance references of the voice sample to be verified, to verify the identity of the speaker (U) from said references and from utterance references stored in the dictionary (51), and to deliver a control signal ($V_c$) having at least two states, one state being representative of positive verification of the identity of an authorized speaker allowing access to said resource.

20. A system for secure access to a transaction restricted to at least one authorized speaker, said system employing the method according to claim 8, characterized in that it comprises at least one telephone device (9) including at least one electroacoustic transducer, the telephone device (9) transmitting over a telephone line at least one voice sample of a speaker (U) to be verified in a stored program control calculation system (5, 50) connected to at least one dictionary (51), the system determining said utterance references of the voice sample to be verified, verifying the identity of the speaker (U) from said references and from utterance references stored in the dictionary (51), and authorizing said transaction on positive verification of the identity of an authorized speaker.

* * * * *